United States Patent [19]
De Fraties et al.

[11] Patent Number: 5,930,938
[45] Date of Patent: Aug. 3, 1999

[54] HOOK SETTING AND FISH PLAYING APPARATUS

[76] Inventors: Kent H. De Fraties; Linda L. De Fraties, both of Rte. 2 Box 342, Sunrise Beach, Mo. 65079

[21] Appl. No.: 09/055,085

[22] Filed: Apr. 3, 1998

[51] Int. Cl.$^6$ .................................................. A01K 91/10
[52] U.S. Cl. ................................................................. 43/15
[58] Field of Search ............................. 43/5, 15, 16, 26.1, 43/27.2, 27.4

[56] References Cited

U.S. PATENT DOCUMENTS

| | | | |
|---|---|---|---|
| 2,908,099 | 10/1959 | Burke | 43/16 |
| 2,996,824 | 8/1961 | Faycosh | 43/16 |
| 4,021,958 | 5/1977 | Snodie | 43/17 |
| 4,142,315 | 3/1979 | Hoffman | 43/15 |
| 4,397,113 | 8/1983 | Pinson | 43/15 |
| 4,461,113 | 7/1984 | Erwin | 43/15 |
| 4,471,553 | 9/1984 | Copeland | 43/15 |
| 4,676,018 | 6/1987 | Kimball | 43/15 |
| 4,730,408 | 3/1988 | Miller | 43/15 |
| 4,750,286 | 6/1988 | Gray | 43/15 |
| 5,359,802 | 11/1994 | Gutierrez | 43/16 |
| 5,383,298 | 1/1995 | Engel | 43/15 |
| 5,542,205 | 8/1996 | Updike | 43/15 |
| 5,570,534 | 11/1996 | Ford . | |

*Primary Examiner*—Robert P. Swiatek
*Assistant Examiner*—Son T. Nguyen
*Attorney, Agent, or Firm*—Richard J. Grundstrom

[57] ABSTRACT

A fish hook setting apparatus which has a main support, a rod holding arm pivotally attached to the main support, a spring between the main support and an end of the rod holding arm, a horizontal extension attached to the top end of the main support and a trigger apparatus at the outer end of the horizontal extension. The trigger apparatus consists of rotatable release plate attached to a support member, a line hook arm attached to the rotatable release plate, and a pivoting release arm attached to the opposite side of the cross member. In operation, a fishing rod, after the baited hook is casted, is placed in the rod holding arm. The rod holding arm, holding the fishing rod, is pivoted to a set position where the pole extends between the release arm and the rotating release plate on the trigger apparatus. This action also applies bias to the spring. The release arm is pivoted downward over the fishing pole and aligned under the rotating release plate. The rotating release plate is rotated over the release arm to a selected position. The fishing line is connected to the line hook. When a fish pulls on the line, the line hook arm is pulled and the rotatable release plate rotates. As the rotatable plate rotated the release arm is freed and the rod holding arm flips upward along with the fishing pole therein. In this manner the fish hook is set. Once set, the combined spring action and pole action will play the fish until the fisherman returns to tend to the rig.

20 Claims, 5 Drawing Sheets

HOOK SETTING AND FISH PLAYING APPARATUS

BACKGROUND OF THE INVENTION

The present invention relates to a hook setting and fish playing apparatus and more particularly to an apparatus that will automatically set a hook when a fish bites the bait and will play the fish until the fisherman returns to tend to his rig.

Fisherman typically use one or more fishing rods and reels while fishing. In many states multiple fishing poles are allowed while in others only one can be used. When more than one rod is in use it is difficult for a fisherman to handle all at the same time. It is also true that often the fishing poles are set down or leaned against something so that the fisherman does not have to constantly tend to the fishing rod or rods. This is because fish do not always hit immediately when the baited hook is placed in the water.

During these times of waiting or when one or multiple poles are in use, it is handy to have a means of holding the fishing rods. It is even more beneficial if the means also assists the fisherman in catching fish. There have been many types of rod holders made and are know in the art. Some are very simple while others are more complex. The simplest is simply a tube holder for receiving a handle of a fishing pole. However, these are only holders and they do not help in catching fish. The most they do is to give the arms of the fisherman a break.

There are also a few automatic hook setting devices known in the art. Again, some are simple while others are complicated. Typically these required high maintenance or did not function very well. There has been no known model which has taken the market by a majority of fisherman. All of these automatic hook setters generally work by the rod and reel being rapidly jerked back when triggered by a pull on either the rod or on the fishing line. Most if not all the apparatuses use some sort of spring to cause the jerk. Many different spring and trigger mechanisms have been tried. Most are expensive, require high maintenance, or just don't work very well. In addition, some allowed to much slack in the line when the jerk occurs and the hook does not set as expected.

Some of the apparatuses previously known in the art also had a problem of loosing the rod and reel. When the fish struck the fishing pole was often pulled from the apparatus or when the trigger activated, the sudden jerk, along with the pull by the fish, would throw the pole from the holder.

The present apparatus overcomes these problems. The present invention provides a means of holding a fishing pole for an extended period while waiting for a fish to strike. The hook setting and fish playing apparatus of this invention can be mounted on practically any fishing platform, such as a boat, dock, shore, ice during ice fishing or any other type of fishing platform, to effectively hold a fishing pole for the fisherman. In addition, the hook setting and fish playing apparatus can be used to play a fish for a period of time until the fisherman returns to tend to his lines.

Often fisherman set things like trout lines which contain many hooks and has the possibility of catching many fish. Fisherman also leave fishing poles out over extended times in hopes to catch something. In both of these instances there are no means of setting a hook. Any catch results from the fish engulfing the bait and the hook. Thus, the fish actually sets the hook itself. Without a means of setting a hook, these methods of leaving an unattended baited hook results in a low percentage of catches. This invention overcomes these problems.

Ice fisherman, often use a short pole with an attachment that flips a flag when the bait is struck. The present invention also functions for use during ice fishing.

Accordingly, it is an object of the present invention to provide a hook setting and fish playing apparatus that is adaptable to any fishing platform. The hook setting and fish playing apparatus of this invention, can be mounted to practically any fishing platform and can be used in most environments. Previously known apparatuses where typically designed for particular situations and were not as universal as the present invention.

Another object of the present invention is to provide an improved hook setting and fish playing apparatus that is constructed with a very simple and reliable trigger. The effectiveness of this type of apparatus is determined by the ability to sense a fish bite and to be properly triggered. Therefore, the trigger device of this apparatus has been designed to be highly reliable, easy to set and easy to maintain, and easily adjusted for different fishing conditions. Additionally, the trigger apparatus is designed such that there is a minimal amount of slack needed in the fishing line when triggered. This provides a higher percentage of "set hooks" when triggered.

A further object of the present invention is to provide an hook setting and fish playing apparatus that is adapted to play a fish once a hook is set. The hook setting and fish playing apparatus will provide a playing action to prevent a hooked fish from escaping to thereby substantially increase the effectiveness of the apparatus in catching fish. This allows the hook setting and fish playing apparatus of this invention to be left for extended periods and yet maintain a high percentage of catches.

Still another object of the present invention is to provide a hook setting and fish playing apparatus that may be used to hold a fishing pole and reel. The apparatus will hold a fishing pole indefinitely without any input. Additionally, it can be mounted onto any fishing platform and as such it is virtually a universal hook setting and fish playing apparatus.

Still a further object of the present invention is to provide a hook setting and fish playing apparatus that is constructed in a manner which is very cost effective and yet provides a high quality item for the fisherman.

SUMMARY OF THE INVENTION

To accomplish the foregoing and other objects of this invention there is provided a hook setting and fish playing apparatus and more particularly to a fish setting apparatus having a trigger device which releases a release arm. Once released a spring action "flips" the fishing pole to set the fish hook. Once the hook is set, the combined spring action and flexibility of the fishing pole plays the fish until the fisherman returns to tend to his rig.

The hook setting and fish playing apparatus of this invention includes a fish hook setting apparatus which has a main support, a rod holding arm pivotally attached to the main support, a bias means between the main support and the rod holding arm, a horizontal extension attached to main support and a trigger apparatus at the outer end of the horizontal extension.

The trigger apparatus consists of rotatable release plate attached to a support member, a line hook arm attached to the rotatable release plate, and a pivoting release arm attached to the opposite side of the cross member.

In operation, a fishing rod, after the baited hook is casted, is placed in the rod holding arm. A securing means is also provided to secure the rod and reel in the rod holding arm. The rod holding arm, holding the fishing rod, is pivoted to a set position where the pole extends between the release arm and the rotating release plate. This action also applies bias to the spring. The release arm is pivoted downward over the fishing pole and aligned under the rotating release plate. The rotating release plate is rotated over the release arm to a selected position. The fishing line is connected to the line hook. The apparatus is now set.

When a fish pulls on the line, the line hook arm is biased and the rotatable release plate rotates. As the rotatable plate rotates the release arm is freed and the rod holding arm flips upward along with the fishing pole held therein. In this manner the fish hook is set. Once set the combined spring action and pole action will play the fish until the fisherman returns to tend to the rig.

The above and other objects and features of the present invention will be better understood and appreciated from the following detailed description of the main embodiment thereof, selected for purposes of illustration and shown in the accompanying drawings.

DETAILED DESCRIPTION

Figure 1:
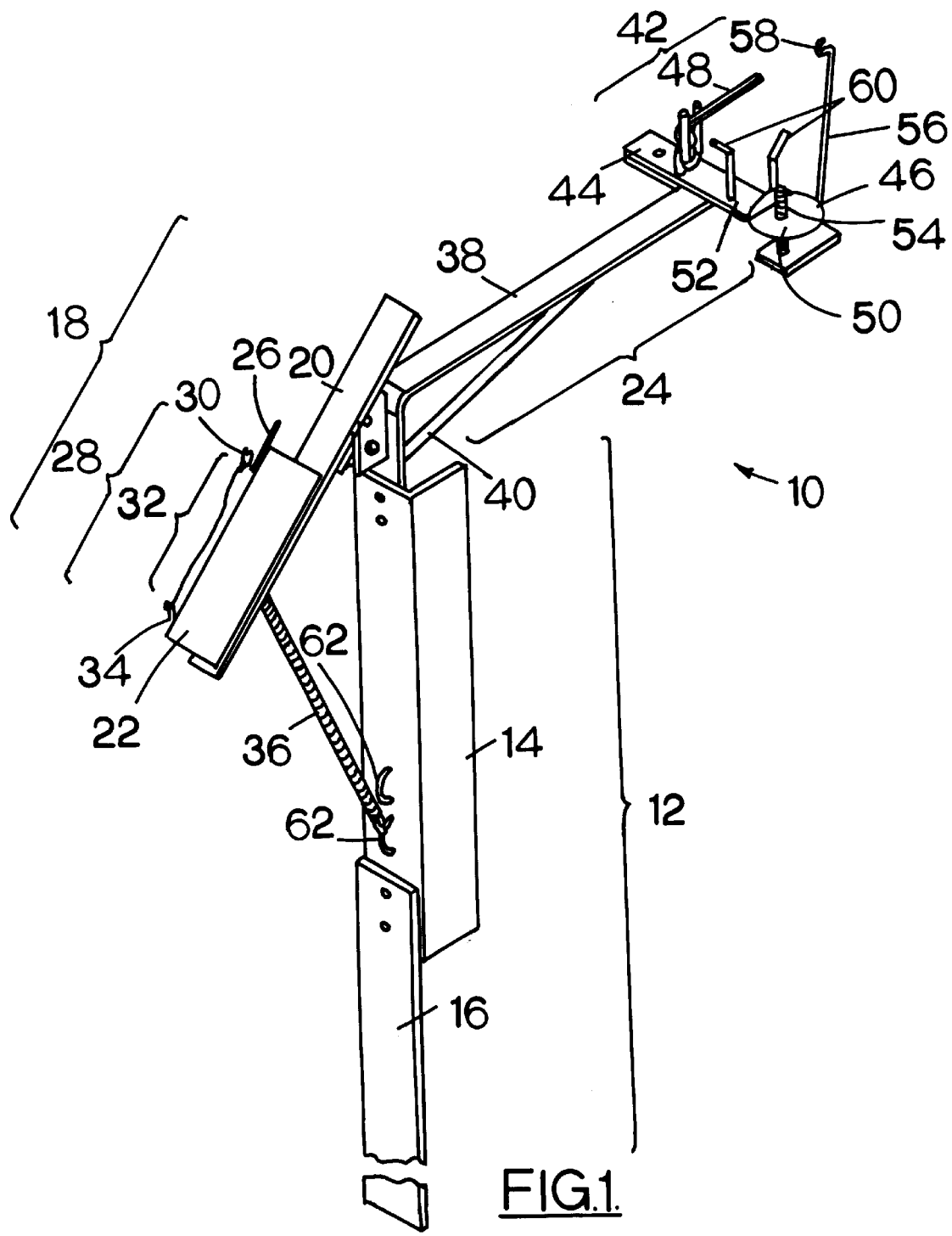
FIG. 1 is an isometric view of the hook setting and fish playing apparatus of this invention.
Figure 2:
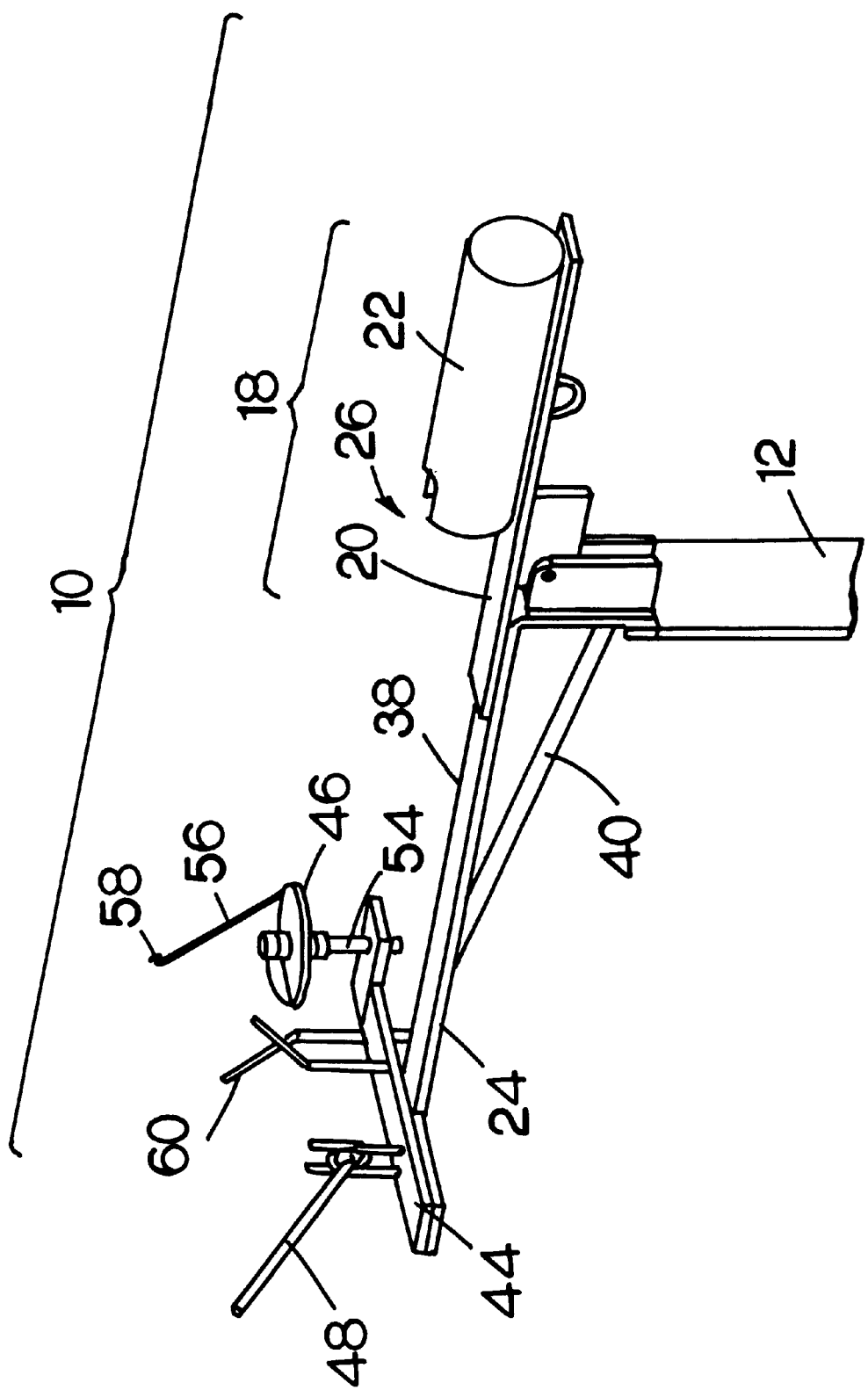
FIG. 2 is another view of the hook setting and fish playing apparatus.
Figure 3:
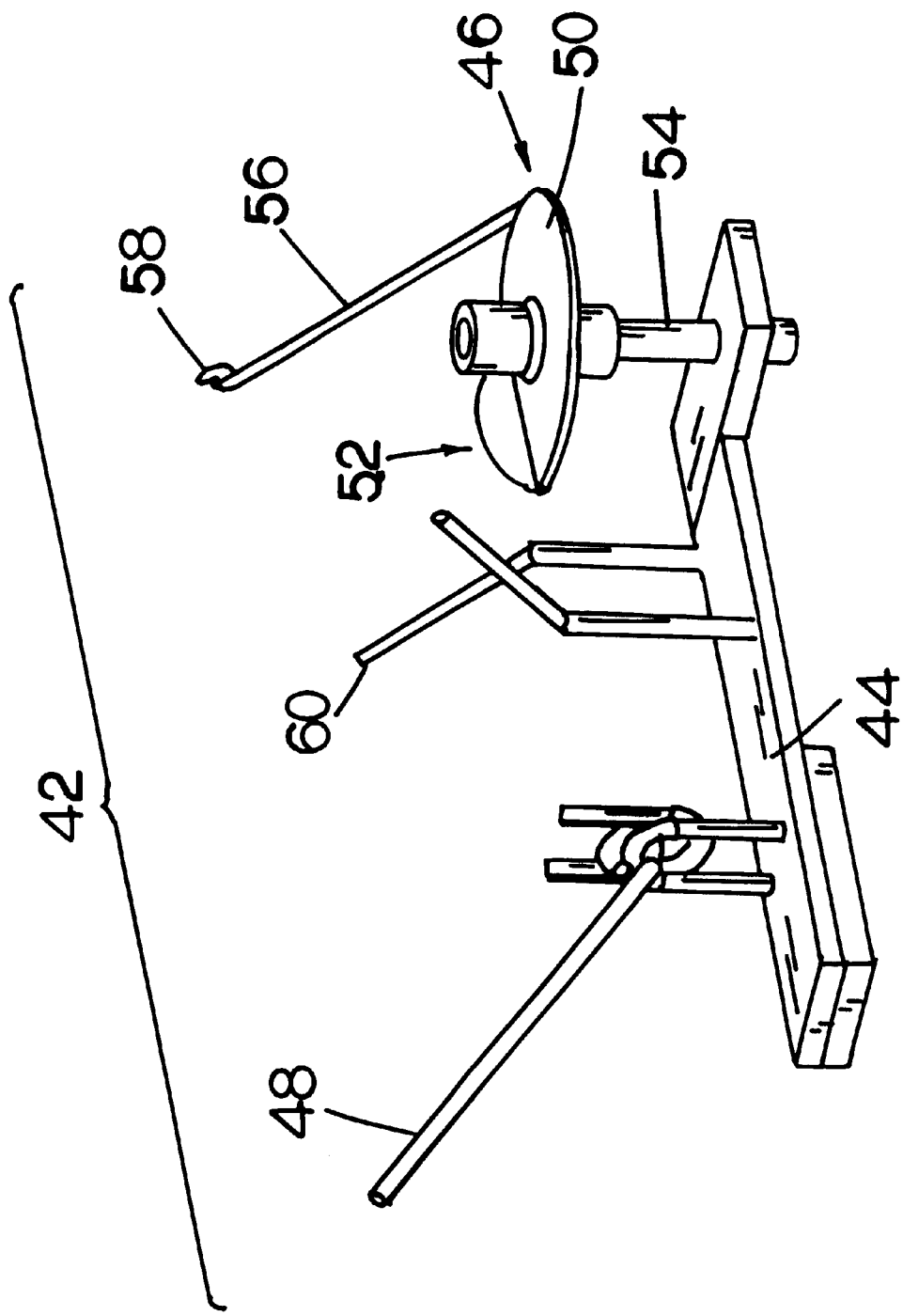
FIG. 3 is a view of the trigger apparatus.
Figure 4:
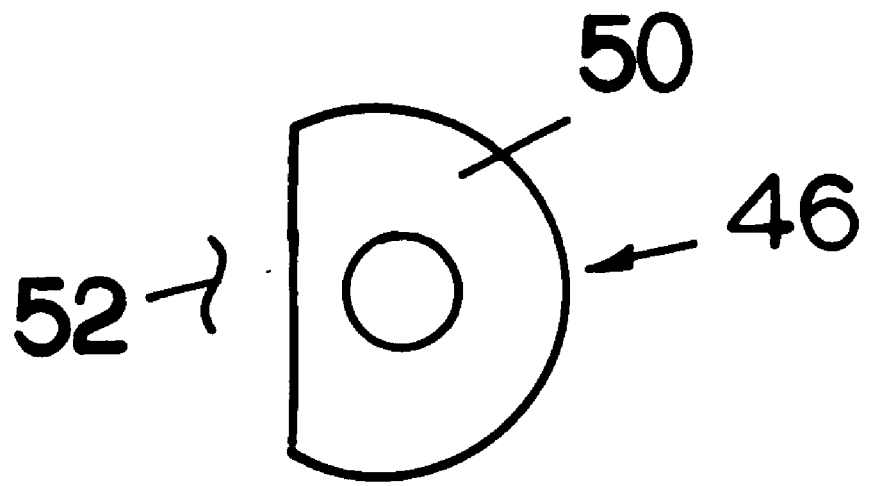
FIG. 4 is a top view showing the rotating release plate.
Figure 5:
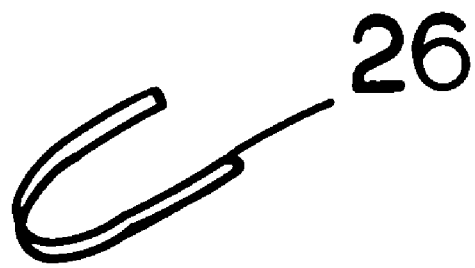
FIG. 5 is a view showing a reel receiver.
Figure 6:
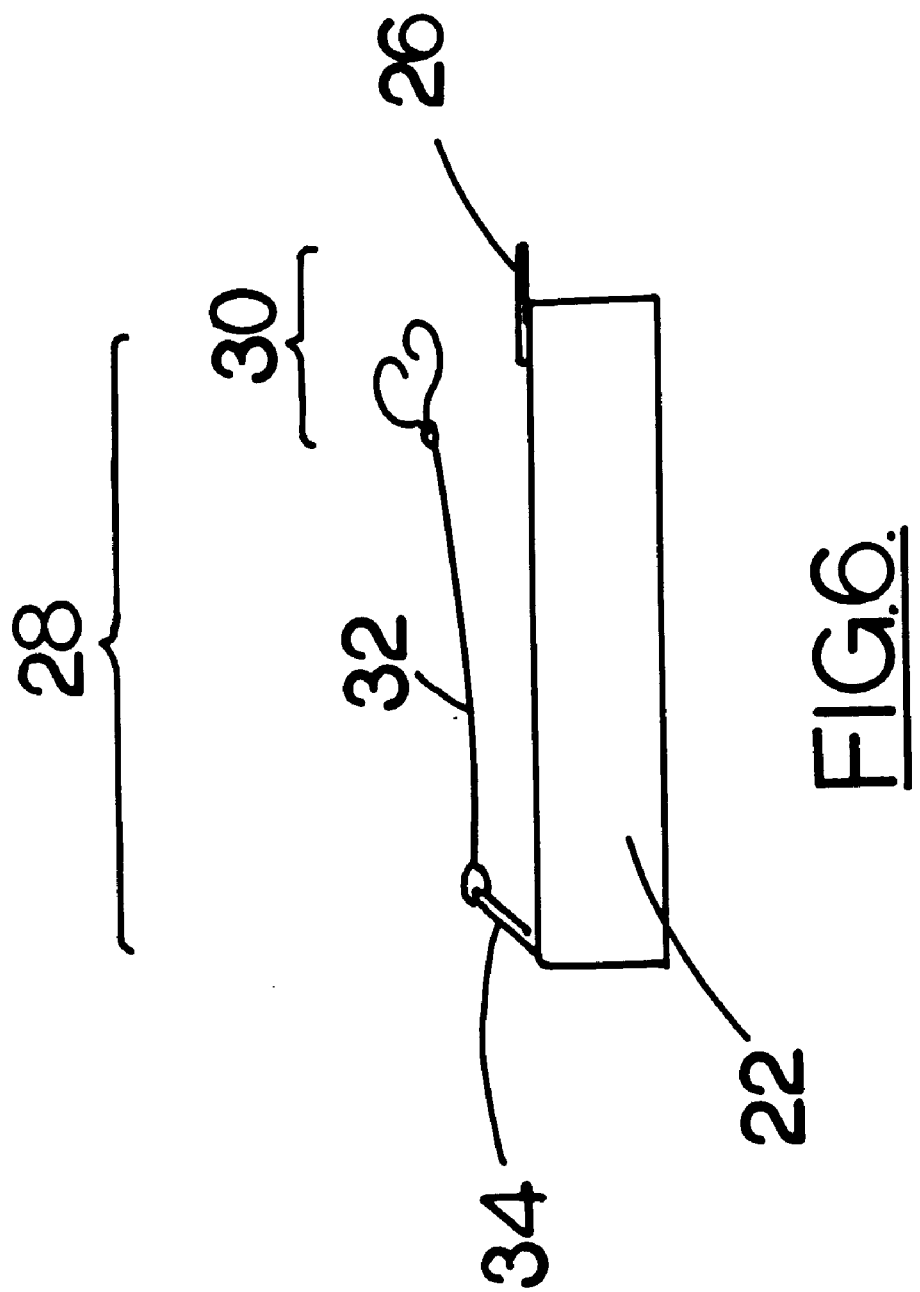
FIG. 6 is a view showing a securing means.

Referring now to the drawings there is shown a preferred embodiment for the hook setting and fish playing apparatus 10 of this invention. Basically, the hook setting and fish playing apparatus 10 of this invention has a main support 12, a rod holding arm 18 pivotally attached to the main support 12, a bias means 36 typically in the form of a spring between the main support 12 and an end of the rod holding arm 18, a horizontal extension 24 attached to the top end of the main support 12 and a trigger apparatus 42 at the outer end of the horizontal extension 24. The trigger apparatus 42 consists of rotatable release plate 46 attached to a support member 44, a line hook arm 56 attached to the rotatable release plate 46, and a pivoting release arm 48 attached to the opposite side of the support member 44.

The preferred embodiment and the best mode contemplated of the hook setting and fish playing apparatus of the present invention are herein described. However, it should be understood that the best mode for carrying out the invention hereinafter described is offered by way of illustration and not by the way of limitation. It is intended that the scope of the invention include all modifications which incorporate its principal design features.

The main support 12 provides a means of attaching the hook setting and fish playing apparatus 10 of this invention to a fishing platform. The fishing platform can be anyplace or anything used to fish from. It could be a boat, a dock, a raft, a pier, ice over a body of water, the shore, or any other place used by a fisherman. As shown herein, the main support 12 is made from two pieces of angle iron. Each piece is approximately fourteen (14) inches long, in the preferred embodiment. The top portion 14 provides all attachments for the components of the fish setting and fish playing apparatus 10 of this invention. The lower portion 16 provides a means to attach the fish setting and fish playing apparatus 10 to a dock or other fishing platform.

The exact configuration of the main support 12 will be determined by the specific application. Various main supports 12 may be made available. The configuration of the lower section 16, which attaches to a boat would of course be determined by the type of boat and where and how it attaches. The lower portion 16 could be, just to name a couple, an attachment that fits into an ore lock or it could be a plate with an upright that is attached to a bow of a johnboat. It could be a type of heavy platform that sits upon the ice during ice fishing. The lower portion could also be an elongated and tapered shaft which could be stuck or driven into the ground along the shore or into ice on an ice covered body of water. Again the specific application would determine the specific configuration.

The various manufacturing techniques now known and available and later known would also determine the exact make up of the main support 12 and all the other components herein described. The goal would be to make a fish setting and fish playing apparatus 10 which is affordable by fisherman yet made of high quality and durable materials while maintaining effectiveness and quality of the fish setting and fish playing apparatus 10. As such, the exact description herein described is considered the preferred embodiment and best mode contemplated at the time of the invention. While the scope and limitations of this invention should be determined by the claims and their equivalents.

The rod holding arm 18 is pivotally attached to the upper end of the main support 12, or as shown, to a portion of the horizontal extension 24 which attaches to a top end of the upper portion 14 of the main support 12. The rod holding arm 18, in the preferred embodiment is made of a beam or arm 20 consisting of an elongated metal plate and a rod tube 22 consisting of a tubular material attached to the top surface and at one end of the beam 20. The rod holding arm 18 receives a handle of a fishing rod and in particular, the handle of the fishing rod fits within the rod tube 22.

The rod tube 22 may also contain a reel receiver 26 at an outer end of the rod tube 22 and a securing means 28 to secure the fishing rod in the rod tube 22. The reel receiver 26 may be made in the form of a two pong fork type bracket attached to the upper side and end of the rod tube 22, as shown. In another embodiment, the reel receiver 26 is simply a U-shaped notch made in the top and at the end of the rod tube 22. The reel receiver 26 generally will receive the upright support that attaches the reel to the rod. The reel receiver prevents the rod and reel from rotating within the rod tube 22. Other configurations may also function without departing from the scope and spirit of the claims.

The securing means 28, in the preferred embodiment and as shown, consists of a clip 30 that attaches to the reel on the fishing rod and a lanyard 32 with one end attached to clip 30. The other end of the lanyard 32 would be attached to an eye or similar functioning device 34 attached to or made part of the opposite end of the rod tube 22. The clip 30 can be any thing which is easily attachable to the fishing reel or rod which can also be easily released. Double pivoting hooks that hooks and attaches to the reels upright support is considered the preferred embodiment but other types of clips could also be used.

The bias means 36 provides the bias to flip the rod holding arm 18 and the fishing rod held therein. The flip is what sets the hook when a fish grabs the baited hook. Generally, the bias means 36 provides a rotational bias of the rod holding arm 18 in relation to the main support 12. Typically as shown and in the preferred embodiment, the bias means 36 is a tension coil spring with one end attached to the rod holding arm 18 towards the end opposite the end attached to the main support. The other end of the bias means 36 is attached at a lower position on the main support 12. This position provides rotational bias to the rod holding arm 22 and the force of the flip that sets the hook.

The bias means 36 in the preferred embodiment is also adjustable. The adjustment provides a means of determining the speed and intensity of the flip. If a faster, harder flip is desired, the bias means 36 is tightened. If a lesser softer flip is desired, the tension on the bias means 36 would be reduced. This is easily accomplished by attaching the lower end of the bias means 36 to either a higher or lower position on the main support 14. Multiple loops, eye hooks or other similar functioning devices, referred to by reference numeral 62, may be provided for this adjustment. Another means of adjustment would be to shorten or lengthen the bias means. This is also easily done in the field. Since springs constitute the principle bias means 36 and springs are made with a continuous helix or spiral, any one of loops of the helixes could be used to attach the bias means 36 to the main support 14 or the rod holding arm 18.

The bias means 36 can be any one of several different forms. As indicated above, the preferred embodiment and the most simple, utilizes a tension spring between the main support 14 and an outer end of the rod holding arm 18. Another embodiment, not shown, utilizes a spiral coil spring as the bias means 36. In this embodiment, the body of the spiral coil spring is attached to the pivot point where the rod holding arm 18 is attached to the main support 12. One end of the spiral spring would be attached to the main support 12 and the other to the rod holding arm 22. The spring would be wound prior to attaching one or both ends to provide the required bias. The amount of tension for adjusting the flip would be determined by how tightly or loosely the spring is wound.

In any event, any bias means 36 could be used as long as rotational bias is provided to the rod holding arm. The principle purpose is that rotational bias is applied to the rod holding arm 18 to provide the flipping action. The particular type of bias means used is not to be limited by this description. Any equivalent bias means is intended to be included.

The horizontal extension 24 is attached to the upper end of the main support 12. As shown and in the preferred embodiment, the horizontal extension 24 is an extended arm, extending at ninety degrees from the top end of the main support 12. The horizontal arm 24 as shown and in the preferred embodiment is made from an elongated metal plate 38 bolted or welded to the top of the main support 12. The length of the horizontal extension 24, in the preferred embodiment, is approximately twelve (12) inches. But then again, the exact length is not crucial to the operation of this invention.

A brace 40 may be utilized to help support the horizontal extension 24. The brace 40 would be for strength, durability and stability of the horizontal extension 24. The brace 40 would be added as determined by the need.

The trigger apparatus 42, which is crucial for this invention, is mounted on the outer end of the horizontal extension 24. In the preferred embodiment, the trigger apparatus 42 has a support member 44, a rotatable release plate 46, a line hook arm 56 and a pivoting release arm 48. Release guides 60 may also be included.

The support member 44 is more or less a rectangular plate. The support member 44 is attached to the outer end of the horizontal extension 24. The rotatable release plate 46 is rotatably attached to one end of the support member 44. The pivoting release arm 48 is attached to the other end. The horizontal extension 24 is attached to the support member 44 between the rotatable release plate 46 and the pivoting release arm.

The rotatable release plate 46 is typically a round plate having a body area 50 and a release area void 52. In the embodiment as shown, the rotatable release plate is a round metal disk which forms the body area 50. The release area void 52 is formed by bending a portion of the body area upwards. Another embodiment, would be a disk made with a cutout area, where the cut out area forms the release area void 52. The non cut out area would form the body area 50.

The rotatable release plate 46 has a center hole for attachment to the support member 44. An axle 54 may be used to attach the rotatable release plate 46 to the support member 44. The axle 54 is fixed on the support member 44 while the center hole on the release plate 46 allows the release plate 46 to rotate on the axle 54. The axle 54 can be commercially available axles or may be a simple bolt with spacers and nuts as appropriate.

The line hook arm 56 is rigidly attached to the body area 50 on the rotatable release plate 46. The line hook arm 56 is made from a simple elongated rod having a hook 58 on the upper end. The hook 58 on the line hook arm 56 receives the fishing line from the fishing rod. Typically, the fishing line between the reel and the first eye on the fishing pole will be pulled sideways from the rod and placed within the hook 58. As the line is pulled by a fish the line hook arm 56 is pulled towards the fishing rod. As the line hook arm 56 is pulled it rotates the rotatable release plate 46. The rotatable release plate is rotated from a holding position to a release position.

The pivoting release arm 48 is pivotally attached to the opposite side of the support member 44 from the rotatable release plate 46. The pivoting release arm is made from an elongated rod. An eye on one end provides a means to pivotally attach the pivoting release arm 48 to the support member 44. The pivoting release arm 48 extends across the support member 44 and fits under the body area 50 on the rotatable release plate 46. The pivoting release arm 48, under bias which will be later explained, is held under the body area 50 of the rotating release plate 46 when in the holding position. The pivoting release arm 48 is released when the rotatable release plate 46 is rotated such that the release area void 52 is above the pivoting release arm 48. This is called the release position. This allows the pivoting release arm 48 to be released and it flips out of the path to release the fishing rod.

To ensure the pivoting release arm maintains proper positioning release guide 60 or a plurality of release guides 60 may be included. The release guide 60 may be a single guide or a plurality of guides. The release guide 60 is generally attached to the support member 44 to act as a guide for the pivoting release arm 48. The release guide 60 provides a guide for the pivoting release arm 48 as it is lowered into a set position and provides guidance during release to ensure proper release clearances and characteristics. As shown in the preferred embodiment, the rod would be placed between the release guide 60 and the pivoting release arm 48. The release guide 60 also functions to prevent the pivoting release arm 48 from rotating while bias is applied to the rod in some situations.

In operation, after the bait is casted or placed into the water, the handle of the fishing rod is inserted into the rod tube 22 on the rod holding arm 18. The rod and the rod holding arm 18 is rotated such that an outer portion of the fishing rod is positioned over the support member 44 between the rotatable release plate 46 and the pivoting release arm 48. This causes bias to be applied by the bias means 36. The pivoting release arm 48 is then pivoted over the fishing rod and positioned under the rotatable release plate 46. The rotatable release plate 46 is rotated such that the end of the pivoting release arm 48 is positioned under the body area 50 of the rotating release plate 46.

The amount of body area 50 placed over the pivoting release arm 48 determines the sensitivity of the hook setting and fish playing apparatus 10. The more of the body area 50 over the pivoting release arm 56 the more "pull" it takes to rotate the rotatable release plate 46 to the release position. On the other hand, if a very small portion of the body area 50 is placed over the pivoting release arm 48 the more sensitive and less "pull" is requires. The adjustment is easily made by rotating the rotatable release plate 46 to the desire position. The position determines the sensitivity or the amount of pull required to rotate the rotatable release plate 46 to the release position.

Once the pivoting release arm 48 is set, the fishing line between the reel and the first eye on the fishing pole is pulled sideways from the rod and placed within the hook 58 on the line hook arm 56. Every thing is now set.

As the line is pulled by a fish the line hook arm 56 is pulled towards the fishing rod. As the line hook arm 56 is pulled it rotates the rotatable release plate 46. The rotatable release plate 46 is rotated from a holding position to a release position. In the release position, the pivoting release arm 48 is freed through the release area void 52 on the rotatable release plate 46. This frees the fishing rod and allows the rod holding arm 18 and the fishing rod held therein to flip upwards due to the bias of the biasing means 36. This flipping action sets the hook. Once set the combine flexibility of the fishing rod and the biasing of the rod holding arm 18 will "play" the fish until the fisherman returns to tend to the catch. In order to "play" a fish the drag on the reel must be properly set.

This invention is thought of as an "Absent Minded Fish Hooker." This is because once set, the fisherman can leave the fishing to the hook setting and fish playing apparatus 10 of this invention. As the fish nibbles, the slightest tug on the line causes the line hook arm 56 to rotate the rotatable release plate 46 to release the fishing rod. The released fishing rod quickly flips upward to set the hook. Once securely hooked, the hook setting and fish playing apparatus 10 plays the fish.

The hook setting and fish playing apparatus 10 has several advantages. This apparatus has a far greater catch percentage than trout lines because the hook is set. It works without attendance day or night and in any season. It provides a visual signal when a fish is caught. It is a simple device which is easily set or operated. Maintenance is fairly simple and it can be economically produced. A means is provided to secure the fishing rig to the hook setting and fish playing apparatus 10 to prevent it's loss. The hook setting and fish playing apparatus 10 overcomes the before mentioned disadvantages over the prior art and provides many advantages.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A hook setting and fish playing apparatus comprising:

a main support;

a rod holding arm pivotally attached to an upper end of said main support, said rod holding arm receiving a handle of a fishing rod;

a bias means to provide bias to said rod holding arm and to said fishing rod held thereon;

a horizontal extension attached to said upper end of said main support; and a trigger apparatus at an outer end of said horizontal extension, said trigger apparatus having a rotatable release plate rotatable attached thereto, said rotatable release plate having a body area and a release area void, said body area for holding said rod holding arm in a holding position and said release area void for releasing said rod holding arm when a fish strikes and rotates said rotatable release plate.

2. A hook setting and fish playing apparatus as set forth in claim 1 in which said trigger apparatus further comprises:

a support member attached to said horizontal extension, said rotatable release plate attached to said support member;

a line hook arm attached to said body area on said rotatable release plate, said line hook arm receiving fishing line from said fishing rod, said line hook arm rotating said rotatable release plate as tension is applied to said fishing line, said rotatable release plate being rotated from a holding position to a release position; and a pivoting release arm pivotally attached to an opposite side of said support member from said rotatable release plate and extending across said support member to said rotatable release plate, said pivoting release arm held under said body area of said rotating release plate when in the holding position, said pivoting release arm holding said fishing rod and said rod holding arm in a biased and armed position, said pivoting release arm being released as said rotatable release plate is rotated to said release position with said pivoting release arm being freed in said release area void, thereby said biasing means applying bias to rapidly pivot said rod holding arm and said fishing rod therein to set a hook at an end of said fishing line and to play a fish thereon.

3. A hook setting and fish playing apparatus comprising:

a main support attached to a fishing platform;

a rod holding arm pivotally attached to an upper end of said main support, said rod holding arm receiving a handle of a fishing rod;

a bias means to provide bias to said rod holding arm and to said fishing rod held thereon;

a horizontal extension attached to said upper end of said main support; and a trigger apparatus at an outer end of said horizontal extension; said trigger apparatus comprising:

a support member attached to said horizontal extension;

a rotatable release plate attached to said support member, said rotatable release plate having a body area and a release area void;

a line hook arm attached to said body area on said rotatable release plate, said line hook arm receiving fishing line from said fishing rod, said line hook arm rotating said rotatable release plate as tension is applied to said fishing line, said rotatable release plate being rotated from a holding position to a release position; and a pivoting release arm pivotally attached to an opposite side of said support member from said rotatable release plate and extending to said rotatable release plate, said pivoting release arm held under said body area of said rotating release plate when in the holding position, said pivoting release arm holding said fishing rod and said rod holding arm in a biased and armed position, said pivoting release arm being released as said rotatable release plate is rotated to said release position with said pivoting release arm being freed in said release area void, thereby said biasing means applying bias to pivot said rod holding arm and said fishing rod therein to set a hook at an end of said fishing line and to play a fish thereon.

4. The hook setting and fish playing apparatus as set forth in claim 3 in which said main support comprises a bracket that attaches to said fishing platform and an upright section, having a top end, extending from said bracket.

5. The hook setting and fish playing apparatus as set forth in claim 3 in which said bias means comprises a spring between the main support and an outer end of said rod holding arm.

6. The hook setting and fish playing apparatus as set forth in claim 5 in which said spring comprises a tension spring extending between said main support and said rod holding arm.

7. The hook setting and fish playing apparatus as set forth in claim 5 in which said spring comprises a spiral coil spring attached between said main support and said rod holding arm.

8. The hook setting and fish playing apparatus as set forth in claim 3 in which said rod holding arm comprises a beam pivotally attached to said main support and a rod tube attached to a top surface of said beam, said rod tube receiving said handle of said fishing rod.

9. The hook setting and fish playing apparatus as set forth in claim 8 in which said rod tube further comprises a reel receiver at an outer end of said rod tube and a securing means to secure said fishing rod in said rod tube.

10. The hook setting and fish playing apparatus as set forth in claim 9 in which said securing means comprises a clip, that attaches to a reel on said fishing rod, and a lanyard, a first end of said lanyard attached to said clip with the other end of said lanyard attached to an inward end on said rod tube.

11. The hook setting and fish playing apparatus as set forth in claim 9 in which said reel receiver comprises a notch in an end of said rod tube, said notch receiving a support stem on a reel on said fishing pole, said reel receiver preventing said fishing rod with said reel from rotating in said rod tube.

12. The hook setting and fish playing apparatus as set forth in claim 9 in which said reel receiver comprises a U-shaped bracket attached to an end of said rod tube, said U-shaped bracket receiving a support stem on a reel, said reel receiver preventing said fishing rod with said reel from rotating in said rod tube.

13. The hook setting and fish playing apparatus as set forth in claim 3 in which said trigger apparatus further comprises a release guide attached to said support member, said release guide providing a guide for said pivoting release arm to ensure proper positioning and release characteristics.

14. A hook setting and fish playing apparatus comprising:
a support member;
a trigger apparatus attached to said support member comprising:
a release plate, with a body area and a release area void, rotatably attached to an end of said support member;
a line hook attached to said body area on said release plate; and
a pivoting release arm attached to an opposite end of said support member, said pivoting release arm extending across said support member to said release plate, said release arm being held under said body area of said release plate and freed by said release area void as said release plate is rotated from a holding position to a release position by said line hook;
a horizontal extension perpendicularly attached to said support member between said release plate and said pivoting release arm;
a main support with a first end attached to a fishing platform, said horizontal extension attached to a second end of said main support extending from said fishing platform;
a rod holding arm pivotally attached to said second end of said main support or to said horizontal extension; and
a bias means to provide bias to said rod holding arm.

15. The hook setting and fish playing apparatus as set forth in claim 14 in which said release plate comprises a round flat plate having an area removed to form said release area void.

16. The hook setting and fish playing apparatus as set forth in claim 14 in which said release plate comprises a round flat plate forming said body area and having an area perpendicularly bent to form said release area void.

17. The hook setting and fish playing apparatus as set forth in claim 14 in which said line hook comprises an extended shaft attached to said release plate with a hook at an upper end, said hook receiving a fishing line from a fishing rod held within said hook setting and fish playing apparatus, said line hook rotating said release plate from a holding position to a release position when tension is applied to said fishing line.

18. The hook setting and fish playing apparatus as set forth in claim 14 in which said bias means comprises a tension spring between said rod holding arm and said main support, said bias means providing bias to pivot said rod holding arm when said pivoting release arm is released from said release plate.

19. The hook setting and fish playing apparatus as set forth in claim 14 in which said bias means comprises a coil spring between said rod holding arm and said main support, said bias means providing bias to pivot said rod holding arm when said pivoting release arm is released from said release plate.

20. The hook setting and fish playing apparatus as set forth in claim 14 in which said bias means is adjustable for controlling the amount of bias on said rod holding arm.

* * * * *